(12) United States Patent
Hamsici et al.

(10) Patent No.: US 12,475,573 B1
(45) Date of Patent: Nov. 18, 2025

(54) DYNAMIC KEYFRAMING IN OBJECT CENTRIC POSE ESTIMATION

(71) Applicant: Apple Inc., Cupertino, CA (US)

(72) Inventors: Onur C. Hamsici, Zurich (CH); Thorsten Gernoth, San Francisco, CA (US); Shuo Feng, San Jose, CA (US)

(73) Assignee: Apple Inc., Cupertino, CA (US)

( * ) Notice: Subject to any disclaimer, the term of this patent is extended or adjusted under 35 U.S.C. 154(b) by 378 days.

(21) Appl. No.: 17/748,517

(22) Filed: May 19, 2022

Related U.S. Application Data

(60) Provisional application No. 63/192,176, filed on May 24, 2021.

(51) Int. Cl.
  *G06T 7/246* (2017.01)
  *G06T 7/254* (2017.01)
  *G06T 7/70* (2017.01)

(52) U.S. Cl.
  CPC ............. *G06T 7/248* (2017.01); *G06T 7/254* (2017.01); *G06T 7/70* (2017.01); *G06T 2207/20224* (2013.01)

(58) Field of Classification Search
  CPC .......... G06T 7/248; G06T 7/254; G06T 7/70; G06T 2207/20224; G06T 2207/30244; G06T 2207/10028; G06T 2207/10016; G06T 7/74; G06T 2207/10024; G06T 7/73; G06T 7/55; G06T 7/80; G06T 7/97
  See application file for complete search history.

(56) References Cited

U.S. PATENT DOCUMENTS

| | | | | |
|---|---|---|---|---|
| 9,432,636 | B2* | 8/2016 | Gourlay | G06T 7/33 |
| 10,360,718 | B2* | 7/2019 | Chernov | G06T 17/20 |
| 11,093,753 | B2* | 8/2021 | Kim | G06T 7/20 |
| 2009/0010507 | A1* | 1/2009 | Geng | G06T 7/593 382/128 |
| 2012/0008830 | A1* | 1/2012 | Yoshii | G06T 7/74 382/103 |
| 2012/0300979 | A1* | 11/2012 | Pirchheim | G06T 7/73 382/103 |
| 2012/0306847 | A1* | 12/2012 | Lim | G06T 7/579 345/418 |
| 2013/0148851 | A1* | 6/2013 | Leung | G06T 7/74 382/103 |
| 2014/0363048 | A1* | 12/2014 | Vrcelj | G06F 18/211 382/103 |

(Continued)

*Primary Examiner* — Henok Shiferaw
*Assistant Examiner* — Woo C Rhim
(74) *Attorney, Agent, or Firm* — Thompson Hine LLP

(57) ABSTRACT

An exemplary process acquires frames of image data in a physical environment including an object, tracks an orientation of the device with respect to the object during the acquiring of the frames, selects keyframes from the frames based on detecting a first condition and selecting a first frame as a keyframe based on a first keyframe selection criterion and the orientation of the device at the first frame, and based on detecting a second condition, selecting a second frame as a keyframe based on a second keyframe selection criterion and the orientation of the device at the second frame, wherein the second keyframe selection criterion is different than the first keyframe selection criterion, and generates an object scan (e.g., a pose graph) based on the frames of image data and the selected keyframes.

24 Claims, 7 Drawing Sheets

(56) References Cited

U.S. PATENT DOCUMENTS

| | | | |
|---|---|---|---|
| 2015/0098645 A1* | 4/2015 | Leung | G06T 7/55 382/154 |
| 2015/0209673 A1* | 7/2015 | Martini | G06T 7/337 463/31 |
| 2016/0086336 A1* | 3/2016 | Lin | H04N 13/282 348/50 |
| 2016/0210761 A1* | 7/2016 | Pollefeys | G06T 7/55 |
| 2016/0335792 A1* | 11/2016 | Forutanpour | G06T 7/579 |
| 2017/0287162 A1* | 10/2017 | Wasik | G06T 7/73 |
| 2018/0315201 A1* | 11/2018 | Cameron | G06T 7/70 |
| 2019/0026943 A1* | 1/2019 | Yan | G06T 7/344 |
| 2019/0114777 A1* | 4/2019 | Maity | G06T 7/579 |
| 2019/0147279 A1* | 5/2019 | Liu | G06V 30/2504 382/181 |
| 2019/0213742 A1* | 7/2019 | Tang | G06V 20/17 |
| 2019/0304170 A1* | 10/2019 | Meilland | G06T 15/205 |
| 2019/0362157 A1* | 11/2019 | Cambias | G06V 10/255 |
| 2020/0020118 A1* | 1/2020 | Chapdelaine-Couture | G06T 7/74 |
| 2020/0047340 A1* | 2/2020 | Hong | G05D 1/0248 |
| 2020/0134866 A1* | 4/2020 | Kitaura | G06T 7/74 |
| 2020/0309529 A1 | 10/2020 | Lambert et al. | |
| 2020/0349735 A1* | 11/2020 | Dine | G06T 19/00 |
| 2020/0378767 A1* | 12/2020 | Li | G01C 21/3848 |
| 2021/0012520 A1* | 1/2021 | Zhou | G01C 11/08 |
| 2021/0090284 A1* | 3/2021 | Ning | G06V 40/23 |
| 2021/0190497 A1* | 6/2021 | Derhy | G06T 7/579 |
| 2021/0209849 A1* | 7/2021 | Lee | G06T 17/20 |
| 2022/0036084 A1* | 2/2022 | Migdal | G06V 10/25 |
| 2022/0061921 A1* | 3/2022 | Crawford | G06T 7/74 |
| 2022/0414919 A1* | 12/2022 | Tyagi | G01C 21/165 |
| 2023/0086735 A1* | 3/2023 | Yan | G06F 16/738 382/190 |
| 2023/0117498 A1* | 4/2023 | Alcantarilla | G06V 10/44 382/103 |
| 2024/0005597 A1* | 1/2024 | Sucar | G06T 7/579 |
| 2024/0104771 A1* | 3/2024 | Zelek | G06T 7/579 |
| 2024/0119605 A1* | 4/2024 | Nakamura | G06T 7/248 |
| 2024/0127474 A1* | 4/2024 | Shiroshima | G06T 7/70 |
| 2024/0135578 A1* | 4/2024 | Kim | G06T 17/00 |

\* cited by examiner

DYNAMIC KEYFRAMING IN OBJECT CENTRIC POSE ESTIMATION

CROSS-REFERENCE TO RELATED APPLICATIONS

This Application claims the benefit of U.S. Provisional Application Ser. No. 63/192,176 filed May 24, 2021, which is incorporated herein in its entirety.

TECHNICAL FIELD

The present disclosure generally relates to acquiring images of an object to enable subsequent device localization, and in particular, to generating an object scan (e.g., a pose graph identifying relative positions of images from different viewpoints) by selecting some of the images as keyframes to enable subsequent device localization.

BACKGROUND

Various techniques are used to determine the location of a device relative to one or more objects in a physical environment. Some techniques use a pose graph that identifies the relative positions of the viewpoints of multiple images (i.e., frames) of the one or more objects. The current location of a device relative to the one or more objects may be determined by comparing a current captured image of the one or more objects with the multiple images of the pose graph. The frame in the pose graph that is most similar to the current image may be identified and its relative position information (e.g., the camera pose associated with that frame) used to determine the device's current position relative to the one or more objects.

Existing scanning processes used to generate a pose graph generally identify a subset of the frames as keyframes for which specific camera pose information is generated based on a first technique (e.g., using image analysis), while other frames (non-keyframes) may have camera pose information that is generated based on a second technique (e.g., using camera motion data to determine a relationship to a nearby keyframe). Existing techniques for generating pose graphs may generate far more keyframes than are needed for accurate localization. For example, keyframes may be selected based on criteria that selects keyframes for each unique camera pose with respect to six degrees of freedom. Such selection criteria will generally result in an unnecessarily large number of keyframes in a pose graph and thus may be inefficient and/or ill-suited for many circumstances, e.g., where computing resources are limited.

SUMMARY

Various implementations disclosed herein include devices, systems, and methods that select frames to use as keyframes for an object scan. Prior techniques identified several keyframes for various six degrees of freedom (6DoF) circumstances (e.g., roll, yaw, pitch, up/down, right/left, and forward/backward). This is reasonable when the entire input image is used for tracking camera pose. However, when camera pose is only defined by some sub-region of the image, such as an object, this introduces redundancy using 6DoF pose. An example keyframe selection process described herein selects fewer keyframes with less redundancy using specific selection criteria. For example, keyframes may be selected based on unique two degrees of freedom (2DoF) circumstances. The 2DoF circumstances may include, for example, changes of the device moving up/down or left/right with respect to the object while keep the entire object in view. Additionally, or alternatively, keyframes may be selected based on determining that the entire object is not within view in any frame for a given 2DoF circumstance. For example, of several frames having the same camera location relative to the object, but different yaw and pitch, only a single frame may be selected as a keyframe. If no single frame of those frames includes an object's three-dimensional (3D) 3D bounding box within its field of view (e.g., in the case of a long object), more than one frame may be selected to ensure that the entire object is represented. The keyframe selection criteria can ensure that the number of keyframes is as small as possible while still representing all of the object. Keyframes undergo a computationally expensive pose optimization process and, thus, selecting fewer keyframes improves efficiency. The object scan (e.g., pose graph) including keyframes and other frames can be used for localization and numerous other use cases (e.g., generating 3D representations of the object).

In general, one innovative aspect of the subject matter described in this specification can be embodied in methods that include the actions of acquiring frames of image data in a physical environment including an object, tracking an orientation of the device with respect to the object during the acquiring of the frames, selecting keyframes from the frames, and generating an object scan based on the frames of image data and the selected keyframes. In some implementations, selecting the keyframes includes, based on detecting a first condition, selecting a first frame as a keyframe based on a first keyframe selection criterion and the orientation of the device at the first frame, and based on detecting a second condition, selecting a second frame as a keyframe based on a second keyframe selection criterion and the orientation of the device at the second frame, wherein the second keyframe selection criterion is different than the first keyframe selection criterion.

These and other embodiments can each optionally include one or more of the following features.

In some embodiments, the first keyframe selection criterion requires selecting a single frame from all frames acquired while differences in the device's orientation with respect to two degrees of freedom were less than a threshold. In some embodiments, the first keyframe selection criterion requires selecting a single frame from all frames acquired while differences in the device's directional location with respect to the object were less than a threshold.

In some embodiments, the second keyframe selection criterion requires selecting a minimum number of frames from all the frames acquired while differences in the device's orientation were less than a threshold such that a collective view provided by the selected keyframes represents the entire object.

In some embodiments, the second keyframe selection criterion requires selecting a single frame from all frames acquired while differences in the device's orientation with respect to more than two degrees of freedom were less than a threshold.

In some embodiments, the first keyframe selection criterion or the second keyframe selection criterion is based on an image quality of the frames of the image data.

In some embodiments, assessing the first condition includes determining that an entirety of the object is within a first field of view associated with the first frame.

In some embodiments, assessing the second condition includes determining that the entirety of the object is not within a second field of view associated with the second frame.

In some embodiments, poses of the keyframes used in the object scan are determined via a pose optimization process.

In some embodiments, the method further includes localizing an electronic device using the object scan, wherein the object scan is a pose graph.

In some embodiments, the method further includes comparing a first image of the physical environment with a plurality of keyframe images of the object, the first image including the object, identifying a first keyframe from the plurality of keyframes based on the comparing, the keyframe associated with a first keyframe position in the coordinate system, and based on identifying the first keyframe, determining a localized position of an electronic device with respect to the coordinate system based on the first keyframe position.

In some embodiments, acquiring frames of the image data includes acquiring images of the object from different perspectives as the device is moved around the object.

In some embodiments, the device includes a user interface, and the method further includes, during movement of the device, displaying the acquired images of the physical environment including the object within the user interface.

In some embodiments, the frames of image data include depth data and light intensity image data obtained during an image capture process.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
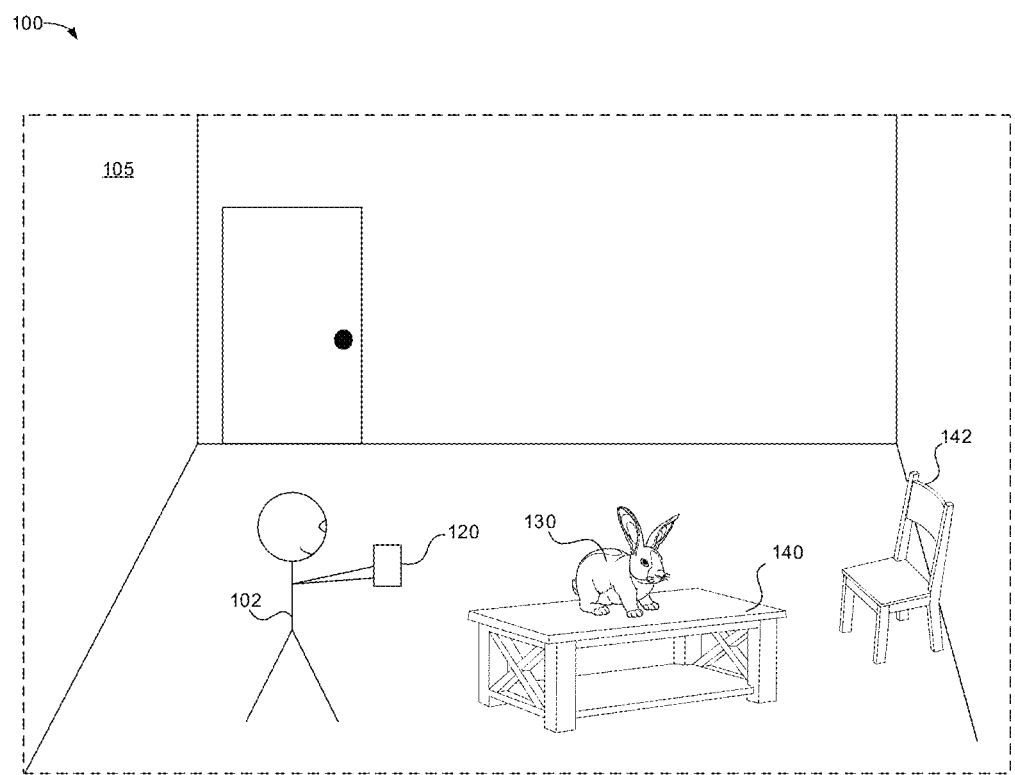
FIG. 1 is an example of a device used within a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous specific details are provided herein to afford those skilled in the art a thorough understanding of the claimed subject matter. However, the claimed subject matter may be practiced without these details. In other instances, methods, apparatuses, or systems, that would be known by one of ordinary skill, have not been described in detail so as not to obscure claimed subject matter.

FIG. 1 illustrates an exemplary operating environment 100 in accordance with some implementations. In this example, the example operating environment 100 involves an exemplary physical environment 105 that includes physical objects such as object 130 (e.g., a statue of a rabbit), table 140, chair 142. Additionally, physical environment 105 includes user 102 holding device 120. In some implementations, the device 120 is configured to present an extended reality (XR) environment to the user 102. The presented environment can include extended reality features.

In some implementations, the device 120 is a handheld electronic device (e.g., a smartphone or a tablet). In some implementations, the device 120 is a near-eye device such as a head worn device. The device 120 utilizes one or more display elements to present views. For example, the device 120 may enclose the field-of-view of the user 102. In some implementations, the functionalities of device 120 are provided by more than one device. In some implementations, the device 120 communicates with a separate controller or server to manage and coordinate an experience for the user. Such a controller or server may be located in or may be remote relative to the physical environment 105.

Figure 2A:
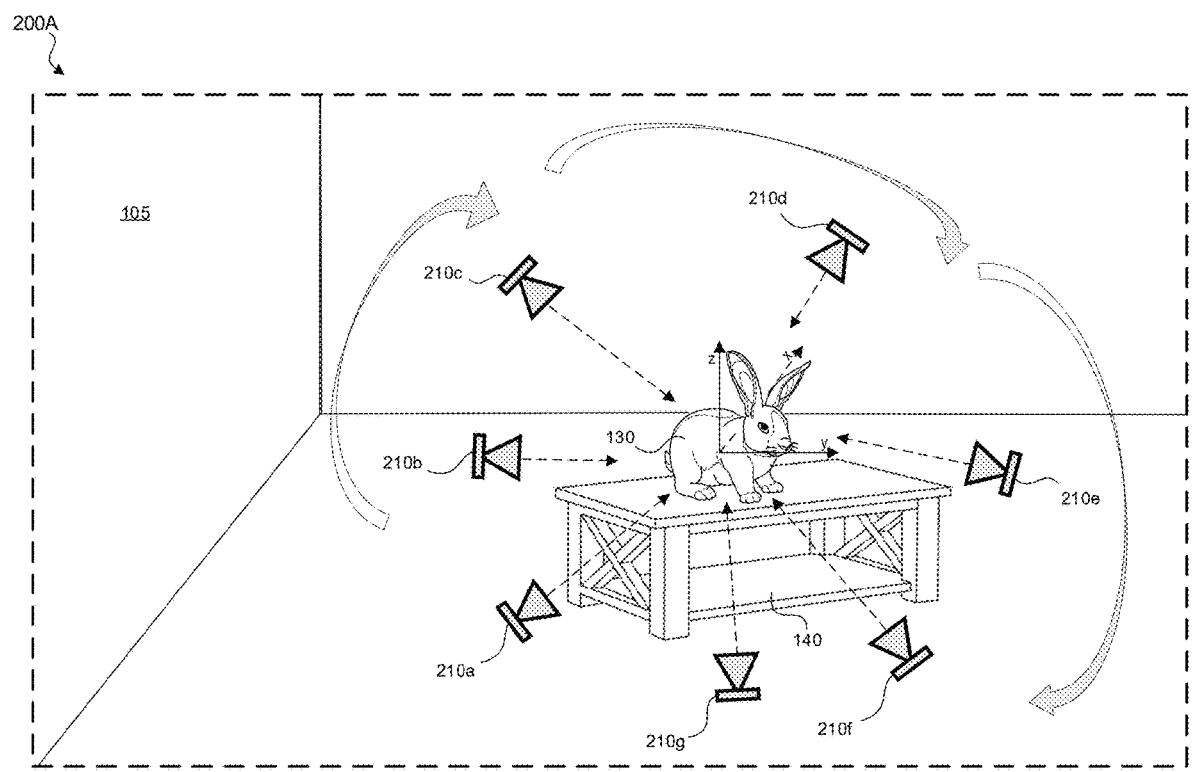
FIG. 2A illustrates example positions of a sensor of the device of FIG. 1 with respect to an object in a physical environment in accordance with some implementations.

FIG. 2A illustrates an example operating environment 200A of example positions of a sensor of the device of FIG. 1 with respect to an object in a physical environment in accordance with some implementations. In this example, the example operating environment 200A illustrates an environment that includes a device 210, an object 130, and a table 140 from the physical environment 105 of FIG. 1. In particular, example operating environment 200A illustrates example camera positions of a camera on a device (e.g., an image sensor of the device 120) with respect to an object (e.g., object 130) in a physical environment (e.g., as a user walks around the object capturing image frames). The device 120 is shown at different camera viewpoints (e.g., camera position 210a-210g) around the object 130. For example, each camera position 210a-210g of device 120 may have a different field of view and perspective relative to the object 130, the target object (e.g., a statue of rabbit on a table). Although only seven different camera positions are illustrated, there can be many more images acquired as the user walks around the object 130 and scans the target object, e.g., capturing video of the object. Based on the path of the device during a scanning process, a pose graph may be generated that includes a record of the relative camera positions (e.g., 6 DoF camera pose relationships) with respect to the object during the scan, providing relative positioning of the image frames captured during the scanning process. Keyframes can be assigned or positioned along the path of the pose graph as discussed herein with reference to FIG. 2B.

Figure 2B:
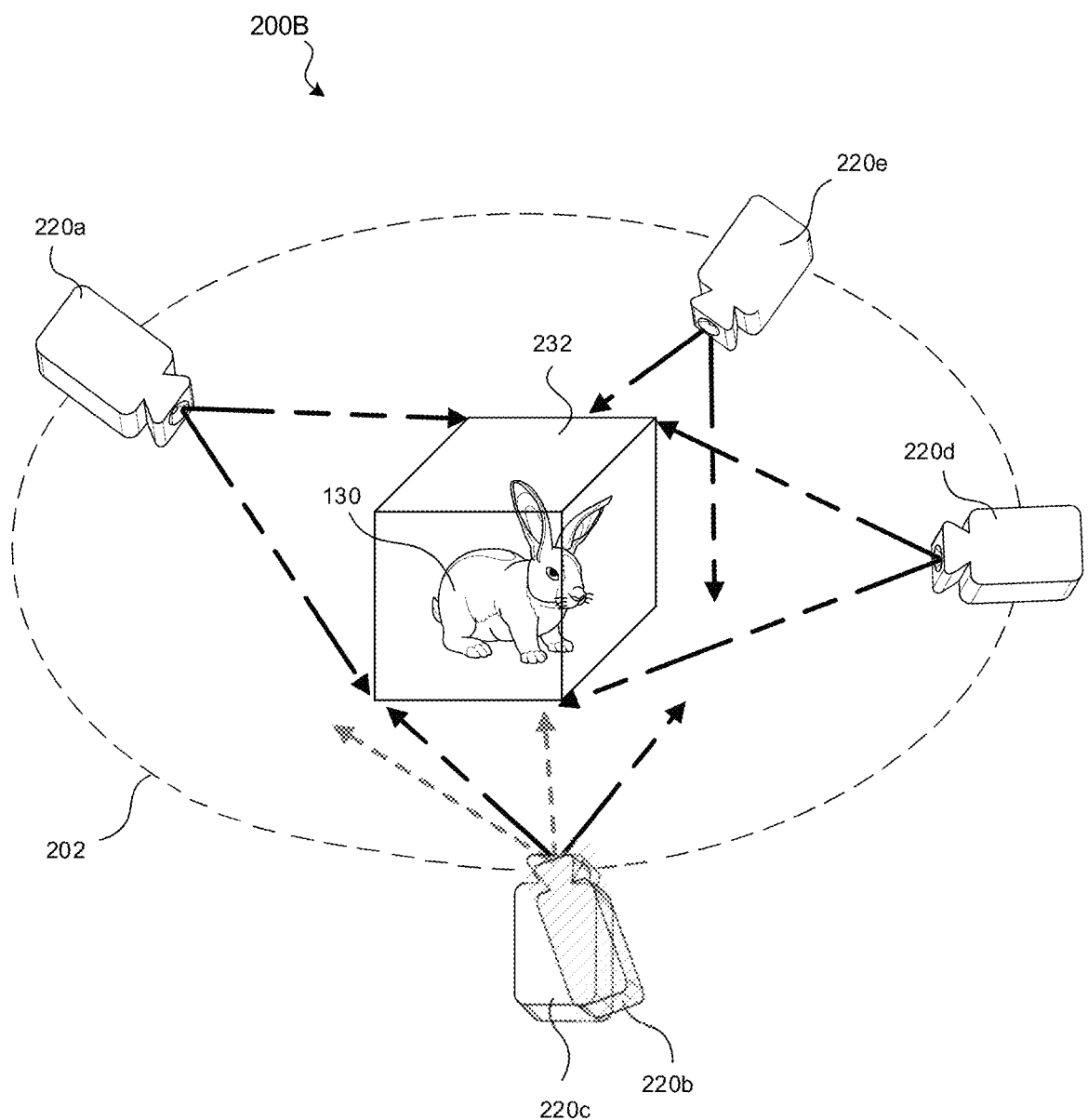
FIG. 2B illustrates an example keyframe selection process for some of the positions of the sensor for FIG. 2A in accordance with some implementations.

FIG. 2B illustrates an example operating environment 200B for an example keyframe selection process for some of the positions of a sensor of a device as illustrated in FIG. 2A in accordance with some implementations. In particular, example operating environment 200B illustrates acquiring image frames of an object (e.g., object 130) by an image sensor of a device (e.g., device 120) using camera positions 220a-220e. The example image frames captured at camera positions 220a-220e are selected as example frames from the camera positions 210a-210g from FIG. 2A for a keyframe selection process. In some implementations, the keyframe selection process includes selecting keyframes by using 2DoF selection criteria. For example, selecting keyframes based on identifying directional locations of the camera (e.g., moving up/down or left/right) relative to the object (e.g., phi and theta). The pose graph path 202 illustrates the frames selected from the device 210 as it follows the pose graph path 202 around the object 130, where only differences in directional location (phi and theta) are used to identify circumstances for selecting a frame as a keyframe. A frame is selected as a keyframe only if no other frame having the same directional location has already been selected as a keyframe. Thus, if two frames are associated with camera poses having the same directional location (phi and theta), but that are shifted in another direction (e.g., yaw, pitch, roll, etc.), then only one of the two frames is selected as a keyframe. For example, camera position 220b and 220c each capture frames from camera poses having the same directional location (phi and theta), but that are shifted in another direction (e.g., camera position 220b is rolled to the left with respect to the roll of camera position 220c). Thus, both of the frames from camera positions 220b and 220c are included in the object scan (e.g., the pose graph), but only one of the frames from those two camera positions 220b and 220c is selected as a keyframe based on the 2DoF keyframe selection criteria (e.g., same directional location (phi and theta)).

Whether and/or how many frames having the same directional location (phi and theta) are selected as keyframes may depend upon whether any of those frames depict the entire object. In this example, the entire object 130 is captured within view of the device at each position 220a-220d, but not at position 220e, as illustrated by the 3D bounding box 232. Therefore, keyframes may be selected from camera position 220a, 220b, and 220d since they are captured at different directional locations, and capture the entire object. And keyframes would not be selected from camera position 210c and 210e because camera position 210c has the same directional location camera position 210b, and camera position 210e does not capture the entire object 130. Thus, instead of selecting additional keyframes based on differences with respect to other degrees of freedom (e.g., roll, yaw, pitch, forward/backward, etc.) less frames are selected to be used as keyframes.

Figure 3:
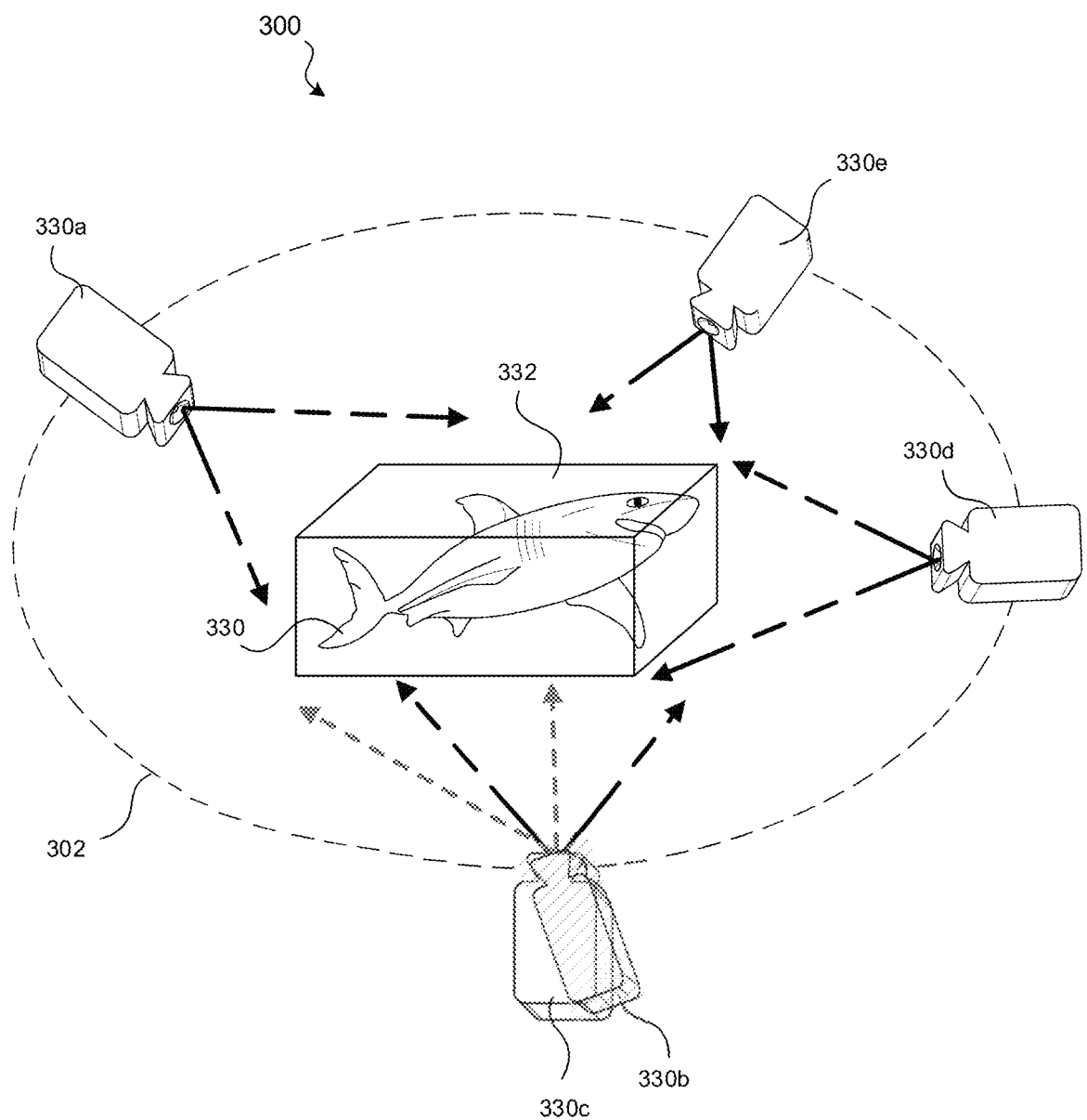
FIG. 3 illustrates another example keyframe selection process in accordance with some implementations.

FIG. 3 illustrates an example operating environment 300 for an example keyframe selection process in accordance with some implementations. In particular, example operating environment 300 illustrates acquiring image frames of an object 330 by an image sensor of a device (e.g., device 120) at exemplary camera positions 330a-330e. In some implementations, the keyframe selection process includes selecting keyframes by using multiple different selection criteria depending on the current circumstances. For example, 2DoF selection criteria (e.g., based on identifying unique directional locations for camera pose circumstances) or 6DoF selection criteria (e.g., based on identifying unique 6DoF camera pose circumstances) may be used based on determining whether the entire object 330 is captured within view of the device at one or more camera position's that would otherwise be represented by a single keyframe. In this example, a frame is selected as a keyframe using a first selection criteria (e.g., a 2DoF-based selection criterion) if the entire object is depicted and using a second selection criterion (e.g., a 6DoF-based selection criterion) if the entire object is not depicted in any of the images having matching 2DoF characteristics (e.g., taken from camera positions having the same directional locations). Thus, if a single frame such as the frame corresponding to camera position 330a depicts the entire object 330 (e.g., all of bounding box 332) then it will be the only frame selected from camera positions having the same directional locations. In contrast, if no single frame has the same directional locations (e.g., such as the frames from camera positions 330b and 330c) depicts the entire object 330 (e.g., all of bounding box 332), then a 6DoF selection criteria may be used to select keyframes as frames associated with unique 6DoF camera poses. In this example, the two frames are associated with camera positions 330b-c having the same directional locations, but that are shifted in another direction (e.g., roll, yaw, pitch, etc.), but both are selected as keyframes since they are associated with unique 6DoF camera positions 330b-c. Thus, both of the frames from camera positions 330b and 330c are included in the object scan (e.g., the pose graph) as keyframes based on the 6DoF keyframe selection criteria.

Figure 4:
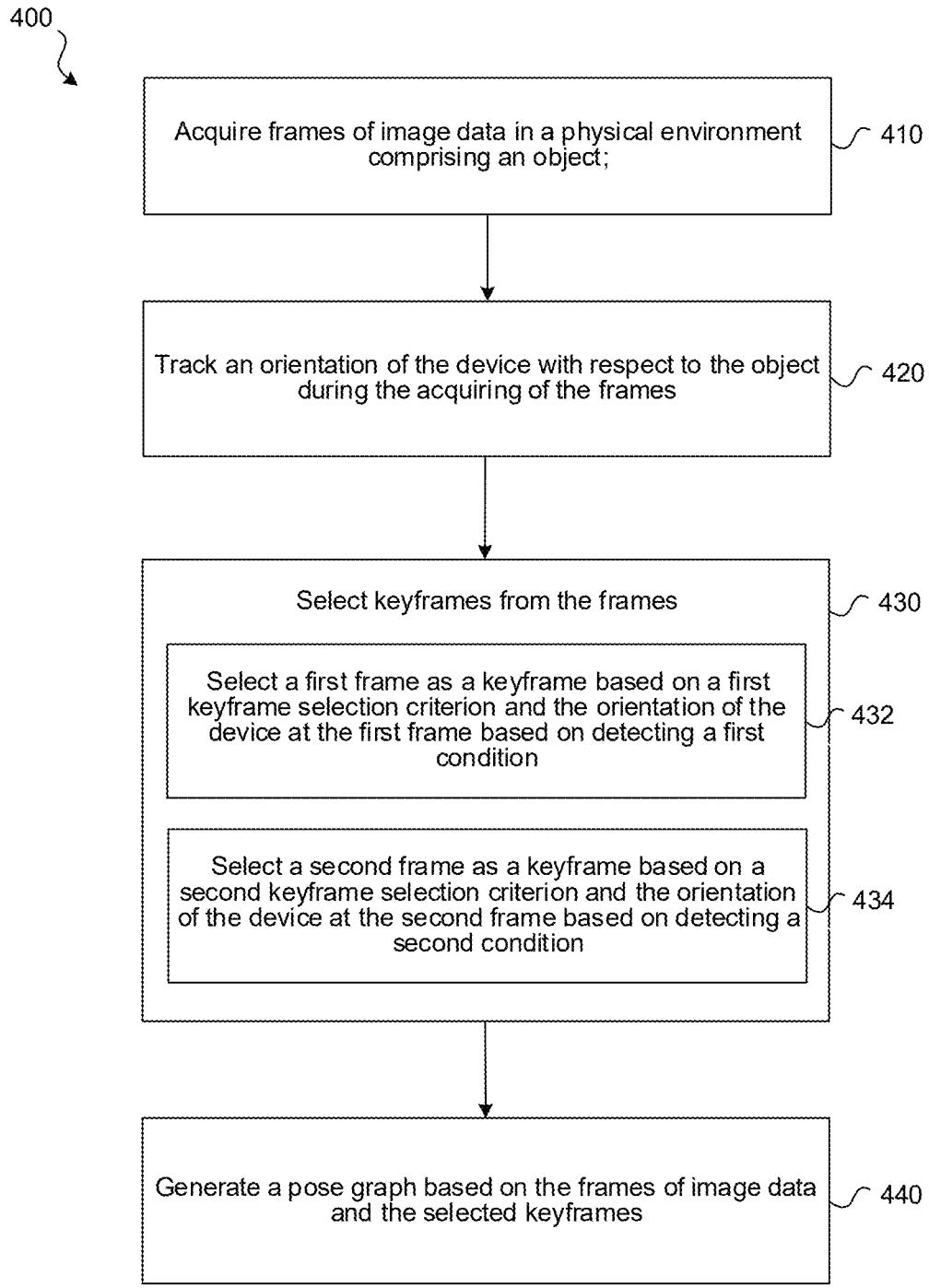
FIG. 4 is a flowchart representation of an exemplary method that generates an object scan (e.g., a pose graph) based on frames of image data and selected keyframes based on a keyframe selection process in accordance with some implementations.

FIG. 4 is a flowchart representation of an exemplary method 400 that selects keyframes based on detecting conditions within frames of image data of an object in a physical environment, and generates an object scan (e.g., a pose graph) based on the frames of image data and the selected keyframes in accordance with some implementations. In some implementations, the method 400 is performed by a device (e.g., device 120 of FIG. 1), such as a mobile device, desktop, laptop, or server device. In some implementations, the device has a screen for displaying images and/or a screen for viewing stereoscopic images such as a head-mounted display (HMD). In some implementations, the method 400 is performed by processing logic, including hardware, firmware, software, or a combination thereof. In some implementations, the method 400 is performed by a processor executing code stored in a non-transitory computer-readable medium (e.g., a memory). The keyframe selection process of method 400 is illustrated with examples with reference to FIGS. 2A, 2B, and 3, and illustrated as a system flow diagram with reference to FIG. 5.

At block 410, the method 400 acquires frames of image data in a physical environment including an object. In some implementations, acquiring frames of the image data includes acquiring images of the object from different perspectives as the device is moved around the object. For example, a user moves a device (e.g., a mobile device such as device 120) around an object (e.g., a statue on top of a table such as object 130) in a physical environment to acquire images of the object from different sides. In some implementations, the sensor data may include depth data and motion sensor data.

The sensor data can include depth data. The depth data can include pixel depth values from a viewpoint and sensor position and orientation data. In some implementations, the depth data is obtained using one or more depth cameras. For example, the one or more depth cameras can acquire depth based on structured light (SL), passive stereo (PS), active stereo (AS), time-of-flight (ToF), and the like. Various techniques may be applied to acquire depth image data to assign each portion (e.g., at a pixel level) of the image. For example, voxel data (e.g., a raster graphic on a 3D grid, with the values of length, width, and depth) may also contain multiple scalar values such as opacity, color, and density. In some implementations, depth data is obtained from sensors or 3D models of the content of an image. Some or all of the content of an image can be based on a real environment, for example, depicting the physical environment 105 around the device 120. Image sensors may acquire images of the physical environment 105 for inclusion in the image and depth information about the physical environment 105. In some implementations, a depth sensor on the device 120 determines depth values for voxels that are determined based on images acquired by an image sensor on the device 120.

At block 420, the method 400 tracks an orientation of the device with respect to the object during the acquiring of the frames. For example, the device (e.g., device 120) may include sensors for tracking the devices/depth camera's particular position and orientation (i.e., pose) using odometry, visual inertial odometry (VIO), simultaneous localization and mapping (SLAM), etc., and this position/pose data can be used to align the depth data with light intensity image data. For example, in many applications, (e.g., XR environments), the 6DoF for position and orientation (e.g., pose) of a mobile device are determined. For example, an IMU is used for measuring the device's rotational velocity and linear acceleration. In some implementations, the IMU's signals can be integrated in order to track a device's pose, but only for a limited period of time since the sensors' noise and bias will cause the estimates to diverge. To address the divergence problem, it may be desirable to include a camera in the process (e.g., often referred to as vision-aided inertial navigation). In some implementations, point features are extracted from each image and tracked across space and time in order to obtain additional information for the device's motion (e.g., rotation and translation information). In some instances, however, the scene in front of the camera may contain very few, if any, point features due to lack of texture (e.g., a white wall). Thus, in an exemplary implementation, the IMU data may be corrected by detecting, extracting, and tracking planes from depth data (e.g., acquired from depth sensors, extrapolated from RGB data, etc.) and subsequently processing the plane tracks in order to provide periodic state corrections to the IMU data.

In some implementations, an image assessment instruction set assesses the sensor data to identify an object (e.g., object 130 of FIG. 1). In some implementations, identifying the object may involve identifying the object using a preliminary object model based on information from multiple images and depth information. Identifying the object using a preliminary object model may involve creating a 3D bounding box (e.g., bounding box 232 of FIG. 2B and bounding box 332 of FIG. 3) corresponding to the object.

At block 430, the method 400 selects keyframes from the frames. Selecting the keyframes is based on analyzing the frames with respect to two conditions (e.g., block 432 and block 434). At block 432, the method 400 selects a first frame as a keyframe based on a first keyframe selection criterion and the orientation of the device at the first frame based on detecting a first condition. For example, the first condition may be that the entire object is represented in the first frame, and the first keyframe selection criterion may be 2DoF. For example, as discussed herein with reference to FIG. 2B and FIG. 3, the keyframe selection process may include determining whether an image frame associated with a position of a camera depicts the entire object based on 2DoF-based selection criterion.

In some implementations, the first keyframe selection criterion requires selecting a single frame from all frames acquired while differences in the device's orientation with respect to two degrees of freedom (e.g., directional location (phi and theta)) were less than a threshold. Additionally, or alternatively, the first keyframe selection criterion requires selecting a single frame from all frames acquired while differences in the device's directional location (phi and theta) were less than a threshold.

At block 434, the method 400 selects a second frame as a keyframe based on a second keyframe selection criterion and the orientation of the device at the second frame, where the second keyframe selection criterion is different than the first keyframe selection criterion. For example, the second condition may be that the entire object is not represented in the second frame, and the second keyframe selection criterion may be based on 6DoF selection criteria (e.g., based on identifying unique 6DoF camera pose circumstances).

In some implementations, the second keyframe selection criterion requires selecting a minimum number of frames from all the frames acquired while differences in the device's orientation (e.g., directional location (phi and theta)) were less than a threshold such that a collective view (e.g., based on a bounding box test) provided by the selected keyframes represents the entire object. Additionally, or alternatively, the second keyframe selection criterion requires selecting a single frame from all frames acquired while differences in the device's orientation with respect to more than two (e.g., 6 DoF) degrees of freedom were less than a threshold.

In some implementations, the first keyframe selection criterion or the second keyframe selection criterion is based on an image quality of the frames of the image data. For example, image quality may be analyzed to determine if a frame of image data meets an image quality threshold (e.g., sharpness, distortion/blurriness, noise, dynamic-range, color accuracy, lighting, uniformity, flare, chromatic aberration, and the like) before being selected as a keyframe. For example, the device 120 may be moved too quickly by the user 102 when acquiring the images. In some implementations, a guiding element on a user interface of the device 120 could indicate to the user that the camera/device is moving too quickly (e.g., an indicator as a particular symbol, via text, or both). Additionally, a guiding element could indicate that the lighting is too dark, additional angles are needed, etc.

In some implementations, assessing the first condition includes determining that an entirety of the object is within a first field of view associated with the first frame. For example, an object bounding box (e.g., bounding box 232 of FIG. 2B, bounding box 332 of FIG. 3, etc.) can be scanned with 2DoF camera motion. In some implementations, assessing the second condition includes determining that the entirety of the object is not within a second field of view associated with the second frame. For example, an object bounding box (e.g., bounding box 332 of FIG. 3) cannot be scanned with only a 2DoF selection criteria.

In some implementations, poses of the keyframes used in the pose graph are determined via a pose optimization process. For example, of many frames having the same directional location (phi and theta), only a single frame may be selected as a keyframe. If no single frame of those frames includes an object's 3D bounding box within its field of view (e.g., in the case of a long object), more than one frame may be selected to ensure that the entire object is represented. For example, as illustrated in FIG. 3, camera positions 330*b-c* had the same directional location (phi and theta), and even though they are shifted in another direction (e.g., left/right, up/down, etc.) and would not be selected based on a 2DoF selection criteria, but both are selected as keyframes since they are associated with unique 6DoF camera positions 330*b-c*. The 2DoF and 6DoF selection criteria can ensure that the number of keyframes is as small as possible while still representing all of the object. Keyframes undergo a computationally expensive pose optimization process and, thus, selecting fewer keyframes improves efficiency.

In some implementations, the method 400 includes a localization/relocalization process. For example, the method 400 tracks positions of the device during acquisition of the images based on the identifying of the object in the at least some of the images, the positions identifying positioning and/or orientation (e.g., pose information) of the device with respect to a coordinate system defined based on a position and an orientation of the object. In an exemplary implementation, tracking positions of the device during acquisition of the images based on the identifying of the object tracks the object by updating an object-centric pose of the device, e.g., where the camera is relative to the object in object-based coordinates when each of the images is acquired. In some implementations, the tracking can use a pose graph defined in the object-based coordinates (e.g., a historical record made of the relative camera movement). In some implementations, the method 400 includes localizing an electronic device (e.g., device 120) using the pose graph (e.g., pose graph path 202). In some implementations, the method 400 includes comparing a first image of the physical environment with a plurality of keyframe images of the object, the first image including the object, identifying a first keyframe from the plurality of keyframes based on the comparing, the keyframe associated with a first keyframe position in the coordinate system, and based on identifying the first keyframe, determining a localized position of an electronic device with respect to the coordinate system based on the first keyframe position.

In some implementations, tracking may involve re-localizing when the object goes out of view or when a previously unseen portion of the object is acquired. For example, when an object is take away from the camera view and flipped over, the tracking may need to re-localize and further identify the object as the same object of interest and recalibrate object centric coordinates to determine the flipped object is the same object of interest.

In some implementations, a 3D representation of the object (e.g., object 130) is generated based on the frames of image data, the selected keyframes, and generated pose graph. In an exemplary implementation, the method 400 generates a 3D model of the object (e.g., object 130) based on the images and positions of the device during acquisition of the images. For example, the 3D model may be a 3D mesh representation or a 3D point cloud. In some implementations, the 3D model data could be a 3D representation representing the surfaces in a 3D environment using a 3D point cloud with associated semantic labels. In some implementations, the 3D model data is a generated 3D reconstruction mesh using a meshing algorithm based on depth information detected in the physical environment that is integrated (e.g., fused) to recreate the object in the physical environment. A meshing algorithm (e.g., a dual marching cubes meshing algorithm, a poisson meshing algorithm, a tetrahedral meshing algorithm, or the like) can be used to generate a mesh representing a room (e.g., physical environment 105) and/or object(s) within a room (e.g., object 130, table 140, chair 142, etc.). In some implementations, for 3D reconstructions using a mesh, to efficiently reduce the amount of memory used in the reconstruction process, a voxel hashing approach is used in which 3D space is divided into voxel blocks, referenced by a hash table using their 3D positions as keys. The voxel blocks are only constructed around object surfaces, thus freeing up memory that would otherwise have been used to store empty space. The voxel hashing approach is also faster than competing approaches at that time, such as octree-based methods. In addition, it supports streaming of data between the GPU, where memory is often limited, and the CPU, where memory is more abundant.

In some implementations, the device includes a user interface, and the method 400 further includes, during movement of the device, displaying the acquired images of the physical environment including the object within the user interface. In some implementations, during movement of the device, a user interface may display the acquired environment that includes the object and provide a user interface element. For example, a user interface element (e.g., an extended reality image, such as a 3D arrow overlaid on a live video stream) can show a user additional angles and/or perspectives to acquire the object. In some implementations, the user interface can display a preliminary 3D model of the object (e.g., a 3D mesh, 3D bounding box, etc.). For example, a picture-in-picture display of another window can display to the user a 3D model reconstruction in a live preview screen as the user is capturing live video and as the live video is streaming on the main viewing screen. For example, in use, for the method 400, a user may desire to create a 3D reconstruction of a statue of a rabbit on a table (e.g., object 130), and the user may scan the object in a room with a device (e.g., a smartphone such as device 120) and the processes described herein would acquire sensor data (e.g., image data such as light intensity data, depth data, camera position information, etc.), assess the images with respect to object centric position tracking of the device with respect to the object, select a subset of the sensor data based on the assessment, and provide a 3D representation for the object as it is being scanned by the user. In some implementations, the 3D representation may be automatically displayed and updated on the user device overlaid during a live camera feed. In some implementations, the 3D representation may be provided after some type of user interaction after scanning the physical environment with more than one object identified. For example, the user may be shown options of identified objects, and the user may select or click on the particular object that the user wants included in the 3D representation, and the 3D representation would then be displayed with the selected object.

Figure 5:
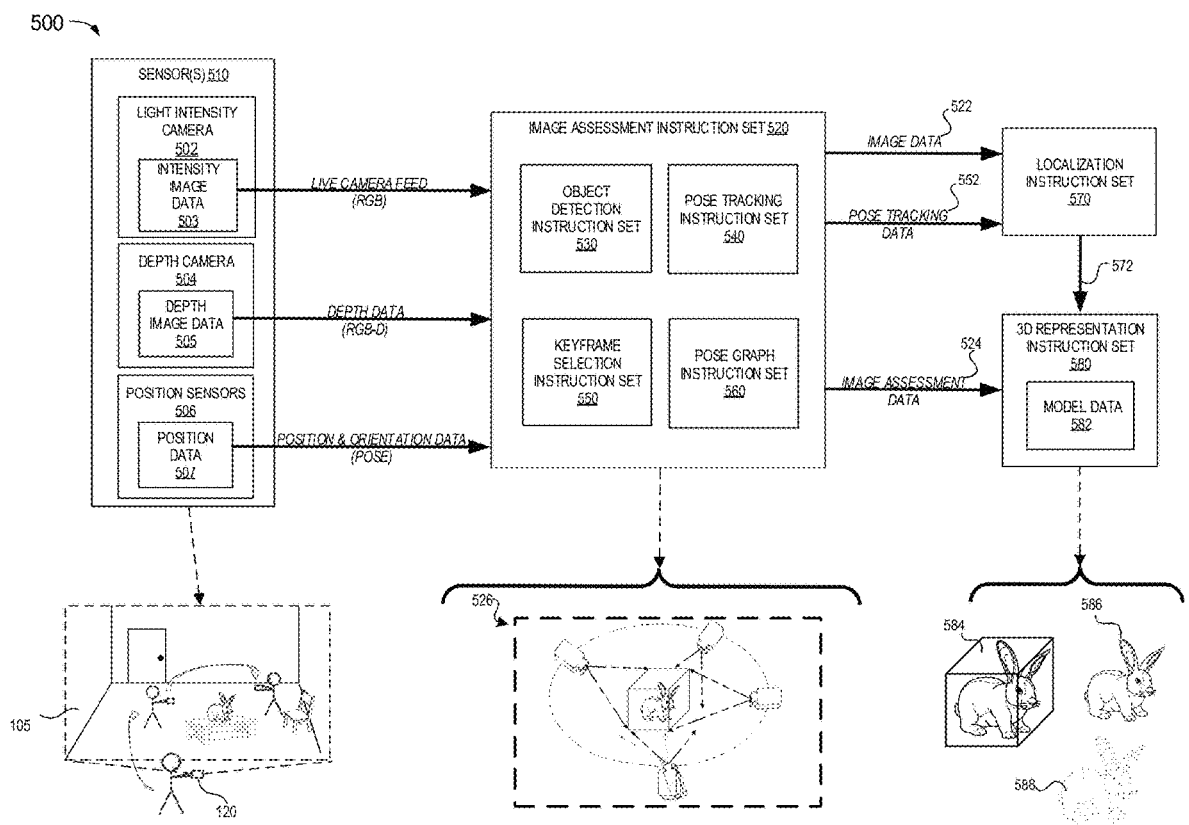
FIG. 5 is a system flow diagram of an example environment in which a system can determine localization of a device and/or generate a three-dimensional (3D) representation of an object based on an object scan (e.g., pose graph) generated based on frames of image data and selected keyframes in accordance with some implementations.

FIG. 5 is a system flow diagram of an example environment 500 in which a system can determine localization of a device and/or generate a three-dimensional (3D) representation of an object based on a pose graph generated based on frames of image data and selected keyframes in accordance with some implementations. In some implementations, the system flow of the example environment 500 is performed on a device (e.g., device 120 of FIG. 1), such as a mobile device, desktop, laptop, or server device. The system flow of the example environment 500 can be displayed on a device (e.g., device 120 of FIG. 1) that has a screen for displaying images and/or a screen for viewing stereoscopic images such as a head-mounted display (HMD). In some implementations, the system flow of the example environment 500 is performed on processing logic, including hardware, firmware, software, or a combination thereof. In some implementations, the system flow of the example environment 500 is performed on a processor executing code stored in a non-transitory computer-readable medium (e.g., a memory).

The system flow of the example environment 500 acquires from sensors (e.g., sensors 510) light intensity image data 503 (e.g., live camera feed such as RGB from light intensity camera 502), depth image data 505 (e.g., depth image data such as RGB-D from depth camera 504), and other sources of physical environment information (e.g., camera positioning information 507 such as position and orientation data from position sensors 506) of a physical environment, assesses the images and determines and selects keyframes with respect to the object based on images and tracked positions of a device during acquisition of the images (e.g., the image assessment instruction set 520), determines localization of the device (e.g., the localization instruction set 570), and generates 3D model data 542 of the object from the image assessment data (e.g., the 3D representation instruction set 580).

In an example implementation, the environment 500 includes an image composition pipeline that acquires or obtains data (e.g., image data from image source(s) such as sensors 510) for the physical environment. Example environment 500 is an example of acquiring image sensor data (e.g., light intensity data, depth data, and position information) for a plurality of image frames. The image source(s) may include a depth camera 504 that acquires depth data 505 of the physical environment, a light intensity camera 502 (e.g., RGB camera) that acquires light intensity image data 503 (e.g., a sequence of RGB image frames), and position sensors 506 to acquire positioning information. For the positioning information 507, some implementations include a visual inertial odometry (VIO) system to determine equivalent odometry information using sequential camera images (e.g., light intensity data 503) to estimate the distance traveled. Alternatively, some implementations of the present disclosure may include a SLAM system (e.g., position sensors 506). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In an example implementation, the environment 500 includes an image assessment instruction set 520 that is configured with instructions executable by a processor to obtain sensor data (e.g., image data such as light intensity data, depth data, camera position information, etc.) and select keyframes as an object centric subset of sensor data (e.g., image assessment data 524) using one or more of the techniques disclosed herein. In some implementations, image assessment instruction set 520 includes an object detection instruction set 530 that is configured with instructions executable by a processor to analyze the image information and identify objects within the image data. For example, the object detection instruction set 530 of the image assessment instruction set 520 analyzes RGB images from a light intensity camera 502 with a sparse depth map from a depth camera 504 (e.g., time-of-flight sensor) and other sources of physical environment information (e.g., camera positioning information 507 from a camera's SLAM system, VIO, or the like such as position sensors 506) to identify objects (e.g., furniture, appliances, statues, etc.) in the sequence of light intensity images. In some implementations, the object detection instruction set 530 uses machine learning for object identification. In some implementations, the machine learning model is a neural network (e.g., an artificial neural network), decision tree, support vector machine, Bayesian network, or the like. For example, the object detection instruction set 530 uses an object detection neural network instruction set to identify objects and/or an object classification neural network to classify each type of object.

In some implementations, image assessment instruction set 520 includes a pose tracking instruction set 540 that is configured with instructions executable by a processor to analyze the image information with respect to the positioning and orientation information (e.g., position data 507) of the device motion during image acquisition. For example, the pose tracking instruction set 540 of the image assessment instruction set 520 analyzes camera positioning information 507 from a camera's SLAM system, VIO, or the like (e.g., position sensors 506) to track the device location with respect to object (e.g., object centric data) in the sequence of light intensity images.

In some implementations, image assessment instruction set 520 includes a keyframe selection instruction set 550 to select frames to use as keyframes for an object scan. The keyframe selection instruction set 550 may select fewer keyframes with less redundancy using specific selection criteria that prior techniques that identified keyframes for 6DoF circumstances. For example, keyframes may be selected based on 2DoF circumstances. The 2DoF circumstances may include, for example, changes of the device with respect to directional location (phi and theta). Additionally, or alternatively, keyframes may be selected by keyframe selection instruction set 550 based on determining that the entire object is not within view in any frame for a given 2DoF circumstance as illustrated in FIG. 3 for object 330. For example, of several frames having the same directional location (phi and theta), only a single frame may be selected as a keyframe. If no single frame of those frames includes an object's 3D bounding box within its field of view (e.g., in the case of a long object such as object 330), more than one frame may be selected to ensure that the entire object is represented. The criteria can ensure that the number of keyframes is as small as possible while still representing all of the object.

In some implementations, image assessment instruction set 520 includes a pose graph instruction set 550 that is configured with instructions executable by a processor to analyze the image information with respect to the positioning and orientation information (e.g., position data 507) of the device motion during image acquisition, obtained the selected keyframes from the keyframe selection instruction set 550, and generate a pose graph (e.g. pose graph path 202 of FIG. 2B) as a historical record of the relative camera movement (e.g., positions 220a-220e) with respect to the object (e.g., object 130), as illustrated in image 526. For example, keyframes can be assigned or positioned along the pose graph and a current camera position can be shown relative to the pose graph.

In an example implementation, the environment 500 further includes a localization instruction set 570 that is configured with instructions executable by a processor to obtain image data 522 (e.g., light intensity image data, depth data, etc.) and pose tracking data 552, and track a location of a moving device in a 3D coordinate system using one or more of the techniques disclosed herein. For example, the localization instruction set 570 analyzes image data, pose data, and the like, from the image assessment instruction set 520, and/or other sources of physical environment information (e.g., camera positioning information from a camera's SLAM system, a visual inertial odometry (VIO) system, or the like) to track device location information for 3D reconstruction (e.g., 3D representations of virtual content generated for an XR experience that can display both real world objects of a physical environment and virtual content).

In an example implementation, the environment 500 further includes a 3D representation instruction set 580 that is configured with instructions executable by a processor to obtain the image assessment data 524 (e.g., object centric subset of sensor data that includes keyframes and pose graph data) from the image assessment instruction set 520, localization data 572 from the localization instruction set 570, and generate 3D model data 582 using one or more techniques. For example, the 3D representation instruction set 580 generates 3D models 584, 586, and/or 588 for each detected object. For example, 3D model 584 includes a 3D bounding box for object 130, 3D model 586 is a 3D reconstruction model of object 130, and 3D model 588 is a 3D point cloud representation of object 130.

In some implementations, the 3D representation instruction set 580 includes an integration instruction set that is configured with instructions executable by a processor to obtain the subset of image data (e.g., light intensity data 503, depth data 505, etc.) and positioning information (e.g., camera pose information 507 from position sensors 506) and integrate (e.g., fuse) the subset of image data using one or more known techniques. For example, the image integration instruction set receives a subset of depth image data 505 (e.g., sparse depth data) and a subset of intensity image data 503 (e.g., RGB) from the image sources (e.g., light intensity camera 502 and depth camera 504), and integrates the subset of image data and generates 3D data. The 3D data can include a dense 3D point cloud (e.g., imperfect depth maps and camera poses for a plurality of image frames around the object) that is sent to the 3D representation instruction set 580. The 3D data can also be voxelized. In some implementations, the integration instruction set is within the image assessment instruction set 520, and the image assessment data 522 is integrated by the integration instruction set before being processed by the 3D representation instruction set 580.

In some implementations, the 3D representation instruction set 580 includes a semantic segmentation instruction set that is configured with instructions executable by a processor to obtain a subset the light intensity image data (e.g., light intensity data 503) and identify and segment wall structures (wall, doors, windows, etc.) and objects (e.g., person, table, teapot, chair, vase, etc.) using one or more known techniques. For example, the segmentation instruction set receives a subset of intensity image data 503 from the image sources (e.g., light intensity camera 502), and generates segmentation data (e.g., semantic segmentation data such as RGB-S data). In some implementations, a segmentation instruction set uses a machine learning model, where a semantic segmentation model may be configured to identify semantic labels for pixels or voxels of image data. In some implementations, the machine learning model is a neural network (e.g., an artificial neural network), decision tree, support vector machine, Bayesian network, or the like. In some implementations, the semantic segmentation instruction set is within the image assessment instruction set 520, and the image assessment data 524 is semantically labeled by the semantic segmentation instruction set before being processed by the 3D representation instruction set 580.

Figure 6:
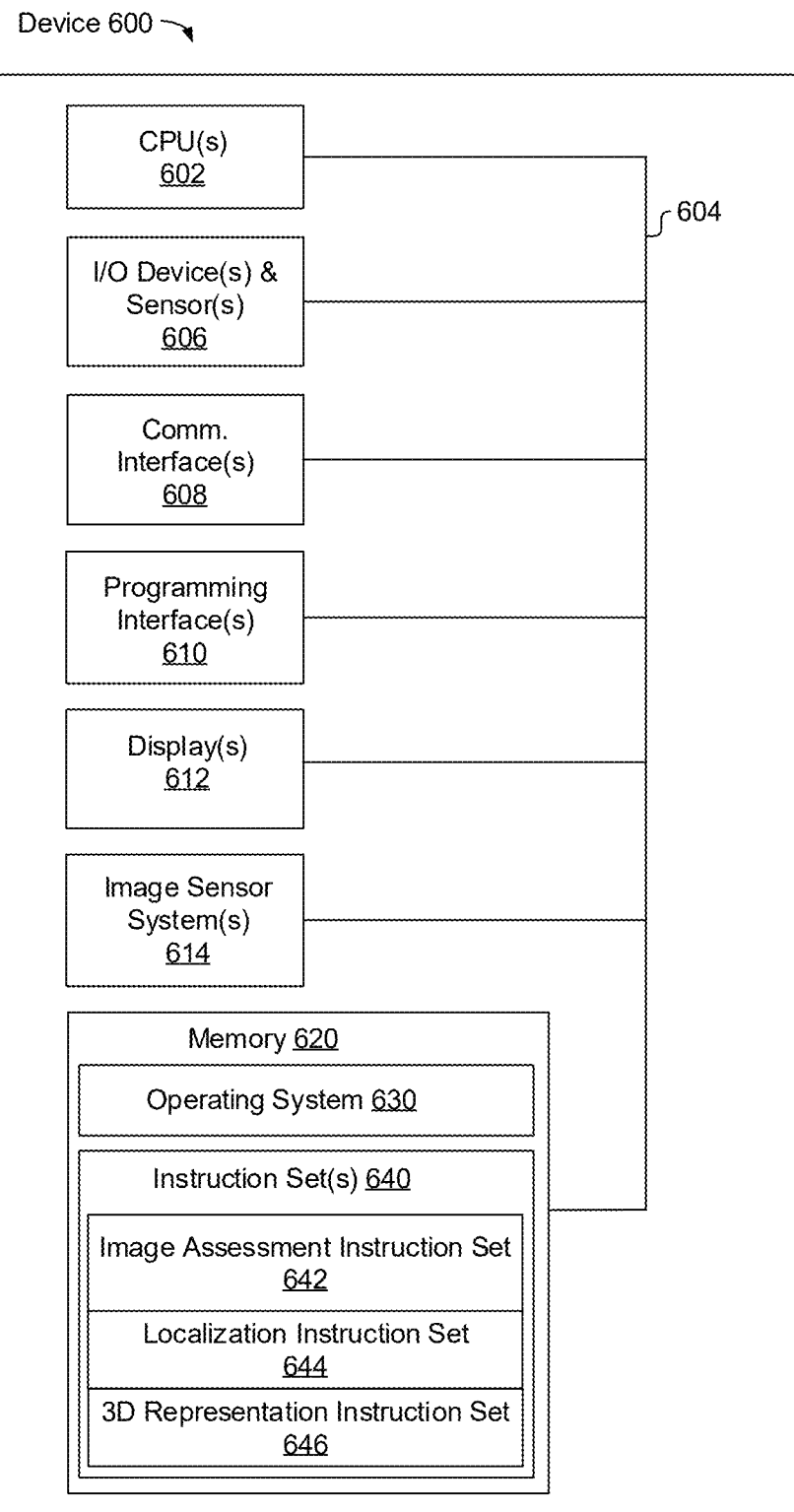
FIG. 6 is an example device in accordance with some implementations.

FIG. 6 is a block diagram of an example device 600. Device 600 illustrates an exemplary device configuration for device 120 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 600 includes one or more processing instruction sets 602 (e.g., microprocessors, ASICs, FPGAs, GPUs, CPUs, processing cores, and/or the like), one or more input/output (I/O) devices and sensors 606, one or more communication interfaces 608 (e.g., USB, FIRE-WIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 610, one or more displays 612, one or more interior and/or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement instruction set (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 612 are configured to present a view of a physical environment or a graphical environment to the user. In some implementations, the one or more displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 612 correspond to diffractive, reflective, polarized, holographic, etc. waveguide displays. In one example, the device 600 includes a single display. In another example, the device 600 includes a display for each eye of the user.

In some implementations, the one or more image sensor systems 614 are configured to obtain image data that corresponds to at least a portion of the physical environment 105. For example, the one or more image sensor systems 614 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 614 further include illumination sources that emit light, such as a flash. In various implementations, the one or more image sensor systems 614 further include an on-camera image signal processor (ISP) configured to execute a plurality of processing operations on the image data.

In some implementations, the device 120 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 10 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 120.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing instruction sets 602. The memory 620 includes a non-transitory computer readable storage medium.

In some implementations, the memory 620 or the non-transitory computer readable storage medium of the memory 620 stores an optional operating system 630 and one or more instruction set(s) 640. The operating system 630 includes procedures for handling various basic system services and for performing hardware dependent tasks. In some implementations, the instruction set(s) 640 include executable software defined by binary information stored in the form of electrical charge. In some implementations, the instruction set(s) 640 are software that is executable by the one or more processing instruction sets 602 to carry out one or more of the techniques described herein.

The instruction set(s) 640 include an image assessment instruction set 642, a localization instruction set 644, and a 3D representation instruction set 646. The instruction set(s) 640 may be embodied as a single software executable or multiple software executables.

The image assessment instruction set 642 (e.g., image assessment instruction set 520 of FIG. 5) is executable by the processing instruction set(s) 602 to obtain sensor data (e.g., image data such as light intensity data, depth data, camera position information, etc.) and select keyframes based on assessing the images with respect to the object based on images and tracked positions of a device during acquisition of the images using one or more of the techniques disclosed herein. For example, the image assessment instruction set 642 analyzes RGB images from a light intensity camera with a sparse depth map from a depth camera (e.g., time-of-flight sensor) and other sources of physical environment information (e.g., camera positioning information from a camera's SLAM system, VIO, or the like) to select a subset of sensor information for keyframe selection. In some implementations, the image assessment instruction set 642 includes separate instruction sets, such as an object detection instruction set, a pose tracking instruction set, a keyframe selection instruction set, and pose graph instruction set, as further discussed herein with reference to FIG. 5.

The localization instruction set 644 (e.g., localization instruction set 570 of FIG. 5) is configured with instructions executable by a processor to obtain sensor data (e.g., light intensity image data, depth data, etc.) and track a location of a moving device in a 3D coordinate system based on plane extraction data using one or more of the techniques disclosed herein. For example, the localization instruction set 644 analyzes image data, pose data, and the like, from the image assessment instruction set 642, and/or other sources of physical environment information (e.g., camera positioning information from a camera's SLAM system, a visual inertial odometry (VIO) system, or the like) to track device location information for 3D reconstruction (e.g., 3D representations of virtual content generated for an extended reality (XR) experience that can display both real world objects of a physical environment and virtual content).

The 3D representation instruction set 646 (e.g., 3D representation instruction set 580 of FIG. 5) is configured with instructions executable by a processor to assess the image assessment data from the image assessment instruction set 642 and the localization data from the localization instruction set 644 and generates a 3D model using one or more techniques disclosed herein. For example, the 3D representation instruction set 244 obtains the image assessment instruction set 242 from the image assessment instruction set 242, obtains segmentation data (e.g., RGB-S data), other sources of physical environment information (e.g., camera positioning information), and generates a 3D model (e.g., a 3D mesh representation, a 3D point cloud with associated semantic labels, or the like).

Although the instruction set(s) 640 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

A physical environment (e.g., physical environment 105) refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device.

For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device having a processor:
        acquiring frames of image data in a physical environment comprising an object;
        tracking an orientation of the device with respect to the object during the acquiring of the frames;
        selecting keyframes from the frames, wherein selecting the keyframes comprises:
            based on detecting a first condition, selecting a first frame as a keyframe based on a first keyframe selection criterion and the orientation of the device at the first frame; and
            based on detecting a second condition, selecting a second frame as a keyframe based on a second keyframe selection criterion and the orientation of the device at the second frame, wherein the second keyframe selection criterion is different than the first keyframe selection criterion and selecting the second frame comprises selecting a single frame from all the frames acquired while differences in the device's orientation with respect to more than two degrees of freedom were less than a threshold such that a collective view provided by the selected keyframes represents the entire object, wherein multiple frames of the frames are captured from same camera locations relative to the object but different orientations; and
        generating an object scan based on the frames of image data and the selected keyframes.

2. The method of claim 1, wherein the first keyframe selection criterion requires selecting a single frame from all frames acquired while differences in the device's orientation with respect to two degrees of freedom were less than a threshold.

3. The method of claim 1, wherein the first keyframe selection criterion requires selecting a single frame from all frames acquired while differences in the device's directional location with respect to the object were less than a threshold.

4. The method of claim 1, wherein the second keyframe selection criterion comprises selecting a subset of the multiple frames from all the frames acquired while differences in the device's orientation were less than a threshold such that a collective view provided by the selected keyframes represents the entire object.

5. The method of claim 1, wherein the second keyframe selection criterion requires selecting a single frame from all frames acquired while differences in the device's orientation with respect to more than two degrees of freedom were less than a threshold.

6. The method of claim 1, wherein the first keyframe selection criterion or the second keyframe selection criterion is based on an image quality of the frames of the image data.

7. The method of claim 1, wherein detecting the first condition comprises determining that an entirety of the object is within a first field of view associated with the first frame.

8. The method of claim 1, wherein detecting the second condition comprises determining that an entirety of the object is not within a second field of view associated with the second frame.

9. The method of claim 1, wherein poses of the keyframes used in the object scan are determined via a pose optimization process.

10. The method of claim 1 further comprising localizing an electronic device using the object scan, wherein the object scan is a pose graph.

11. The method of claim 1 further comprising:
comparing a first image of the physical environment with a plurality of keyframe images of the object, the first image comprising the object;
identifying a first keyframe from the plurality of keyframes based on the comparing, the keyframe associated with a first keyframe position in a coordinate system; and
based on identifying the first keyframe, determining a localized position of an electronic device with respect to the coordinate system based on the first keyframe position.

12. The method of claim 1, wherein acquiring frames of the image data comprises acquiring images of the object from different perspectives as the device is moved around the object.

13. The method of claim 1, wherein the device comprises a user interface, and wherein the method further comprises, during movement of the device, displaying the acquired images of the physical environment including the object within the user interface.

14. The method of claim 1, wherein the frames of image data comprise depth data and light intensity image data obtained during an image capture process.

15. The method of claim 1, wherein one or more frames are captured from capture device orientations that are within an orientation threshold amount, and wherein selecting the first frame comprises determining that an entirety of the object is within a first field of view associated with the first frame of the one or more frames.

16. The method of claim 1, wherein one or more frames are captured from capture device orientations that are within an orientation threshold amount, and wherein detecting the second condition comprises determining that none of the field of views associated with the one or more frames includes a view of an entirety of the object.

17. The method of claim 1, wherein selecting the second frame comprises selecting a subset of the multiple frames which comprises at least one frame with a different orientation than another frame in the subset of the multiple frames.

18. The method of claim 1, wherein selecting the second frame comprises selecting the second frame instead of another frame captured at the same location when the orientation of the device differs from the orientation at the second frame by less than a threshold amount.

19. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
acquiring frames of image data in a physical environment comprising an object;
tracking an orientation of the device with respect to the object during the acquiring of the frames;
selecting keyframes from the frames, wherein selecting the keyframes comprises:
based on detecting a first condition, selecting a first frame as a keyframe based on a first keyframe selection criterion and the orientation of the device at the first frame; and
based on detecting a second condition, selecting a second frame as a keyframe based on a second keyframe selection criterion and the orientation of the device at the second frame, wherein the second keyframe selection criterion is different than the first keyframe selection criterion and selecting the second frame comprises selecting a single frame from all the frames acquired while differences in the device's orientation with respect to more than two degrees of freedom were less than a threshold such that a collective view provided by the selected keyframes represents the entire object, wherein multiple frames of the frames are captured from same camera locations relative to the object but different orientations; and
generating an object scan based on the frames of image data and the selected keyframes.

20. The device of claim 19, wherein the first keyframe selection criterion requires selecting a single frame from all frames acquired while differences in the device's orientation with respect to two degrees of freedom were less than a threshold.

21. The device of claim 19, wherein the first keyframe selection criterion requires selecting a single frame from all frames acquired while differences in the device's directional location with respect to the object were less than a threshold.

22. The device of claim 19, wherein the second keyframe selection criterion comprises selecting a subset of the multiple frames from all the frames acquired while differences in the device's orientation were less than a threshold such that a collective view provided by the selected keyframes represents the entire object.

23. The device of claim 19, wherein selecting the single frame from all the frames acquired while differences in the device's orientation were less than the threshold such that the collective view provided by the selected keyframes represents the entire object is based on the device's orientation with respect to more than two degrees of freedom.

24. A non-transitory computer-readable storage medium, storing program instructions executable by one or more processors of an electronic device to perform operations comprising:

acquiring frames of image data in a physical environment comprising an object;

tracking an orientation of the device with respect to the object during the acquiring of the frames;

selecting keyframes from the frames, wherein selecting the keyframes comprises:

based on detecting a first condition, selecting a first frame as a keyframe based on a first keyframe selection criterion and the orientation of the device at the first frame; and based on detecting a second condition, selecting a second frame as a keyframe based on a second keyframe selection criterion and the orientation of the device at the second frame, wherein the second keyframe selection criterion is different than the first keyframe selection criterion and selecting the second frame comprises selecting a single frame from all the frames acquired while differences in the device's orientation with respect to more than two degrees of freedom were less than a threshold such that a collective view provided by the selected keyframes represents the entire object, wherein multiple frames of the frames are captured from same camera locations relative to the object but different orientations; and generating an object scan based on the frames of image data and the selected keyframes.

\* \* \* \* \*